(12) United States Patent
Kim et al.

(10) Patent No.: US 8,357,348 B2
(45) Date of Patent: Jan. 22, 2013

(54) METHOD FOR PREPARING UNIFORM ANATASE-TYPE TITANIUM DIOXIDE NANOPARTICLES

(75) Inventors: Hae Jin Kim, Daejeon (KR); Soon Chang Lee, Daejeon (KR); Jin Bae Lee, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 0 days.

(21) Appl. No.: 13/030,802

(22) Filed: Feb. 18, 2011

(65) Prior Publication Data

US 2011/0150753 A1   Jun. 23, 2011

Related U.S. Application Data

(63) Continuation of application No. PCT/KR2009/005034, filed on Sep. 7, 2009.

(30) Foreign Application Priority Data

Sep. 11, 2008  (KR) .................. 10-2008-0089634

(51) Int. Cl.
  *C01G 23/047*   (2006.01)
(52) U.S. Cl. ....................................... 423/610
(58) Field of Classification Search .............. 423/610
  See application file for complete search history.

(56) References Cited

U.S. PATENT DOCUMENTS

| | | | | |
|---|---|---|---|---|
| 2004/0241502 A1* | 12/2004 | Chung et al. | ......... | 428/702 |
| 2007/0264303 A1* | 11/2007 | Atanasoska et al. | ......... | 424/423 |
| 2010/0264097 A1* | 10/2010 | Sun et al. | ......... | 210/767 |

FOREIGN PATENT DOCUMENTS

| | | | |
|---|---|---|---|
| KR | 10-2004-0073665 A | | 8/2004 |
| KR | 10-2004-0086912 A | | 10/2004 |
| KR | 10-2004-0100732 A | | 12/2004 |
| KR | 10-2007-0019883 A | | 2/2007 |
| KR | 10-0727579 B1 | | 6/2007 |
| KR | 10-0756199 B1 | | 8/2007 |
| WO | WO2009/011658 | * | 1/2009 |

OTHER PUBLICATIONS

Jiang, T. et al., "Preparation of mesoporous titania solid superacid and its catalytic property," Jrl. of Hazardous Materials, 159, pp. 204-209 (2008).
International Search Report for PCT/KR2009/005034, mailed Apr. 15, 2010.

* cited by examiner

*Primary Examiner* — Steven Bos
(74) *Attorney, Agent, or Firm* — Edwards Wildman Palmer LLP

(57) ABSTRACT

The present invention relates to a method for preparing anatase-type titanium dioxide ($TiO_2$) nanoparticles, the method comprising the steps of: uniformly mixing titanium n-butoxide and cetyltrimethyl ammonium salt (CTAS) in water; subjecting the mixture to hydrothermal treatment at a temperature of 60~120° C.; and collecting anatase-type titanium dioxide nanoparticles produced by the hydrothermal treatment and drying the collected nanoparticles. According to the present invention, anatase-type titanium dioxide nanoparticles having excellent crystallinity can be easily prepared in large amounts by a simple process without needing heat treatment.

9 Claims, 6 Drawing Sheets

METHOD FOR PREPARING UNIFORM ANATASE-TYPE TITANIUM DIOXIDE NANOPARTICLES

CROSS-REFERENCES TO RELATED APPLICATION

This is a continuation of International Application No. PCT/KR2009/005034, with an international filing date of Sep. 7, 2009, which claims the benefit of Korean Application No. 10-2008-89634 filed Sep. 11, 2008, the entire contents of which are incorporated herein by reference.

BACKGROUND OF THE DISCLOSURE

1. Technical Field

The present disclosure relates to a method for preparing anatase-type titanium dioxide ($TiO_2$) nanoparticles, in which nano-sized anatase-type titanium dioxide nanoparticles having excellent crystallinity can be prepared in a large amount by a simpler process.

2. Related Art

Titanium dioxide ($TiO_2$) can be used in a wide range of applications, including photocatalysts, gas sensors and solar cells, owing to its electromagnetic, catalytic, electrochemical and photochemical properties, and many studies thereon have been conducted.

A photocatalyst refers to a substance that shows catalytic activity when irradiated with light. When the photocatalyst absorbs UV light having a wavelength of about 400 nm or less, electrons are excited from the valence band to the conduction band while positive holes are formed in the valence band. The excited electrons and holes which have strong oxidation/reduction potential react with air oxygen, water and the like to produce superoxide anions, hydroxyl radicals and the like on the surface of the photocatalyst. Particularly, because hydroxyl radicals (OH—) have high oxidation/reduction potential, they decompose NOx, SOx, volatile organic compounds (VOCs) and various stinking substances into harmless compounds, and thus can be used for the purification of air and the pretreatment of sewage and wastewater. Also, the photocatalyst has the property of killing pathogenic bacteria by oxidation and forming a strongly hydrophilic surface on which water does not form and flows down and which does not steam up. Due to these properties, the photocatalyst can be used in an infinite range of applications, including environmental cleaning, roads, house equipment, electric home appliances, automobiles, agricultural products, daily necessities, signboards, and medical supplies.

Substances known to show the above-described photocatalytic effects include ZnO, CdS, $WO_3$, $TiO_2$ and the like. Of these, titanium dioxide is most widely used as a photocatalyst, because it is physically and chemically stable and has excellent photocatalytic activity. Titanium dioxide is known to have three crystalline types: rutile, brookite and anatase. The anatase-type crystal is known to have the most excellent photocatalytic activity. Also, the anatase-type crystal has small particle size, and the agglomeration thereof is easily controlled. Thus, the larger the specific surface area of the anatase-type crystal, the better is the photocatalytic activity.

Anatase-type titanium dioxide nanoparticles known till now are prepared by hydrolyzing a titanium precursor to prepare amorphous titanium dioxide which is then converted to anatase-type titanium dioxide (Korean Patent Nos. 500305, 756199 and 523451).

Accordingly, it is believed that, if anatase-type titanium dioxide nanoparticles having small size and a uniform shape can be prepared in large amounts by a simpler process, they will have economic impacts on various applications, including photocatalysts.

SUMMARY OF THE DISCLOSURE

In one aspect, the present invention provides a method for preparing anatase-type titanium dioxide nanoparticles, the method comprising the steps of: uniformly mixing titanium n-butoxide and cetyltrimethyl ammonium salt (CTAS) in water; subjecting the mixture to hydrothermal treatment at a temperature of 60~120° C.; and collecting anatase-type titanium dioxide nanoparticles produced by the hydrothermal treatment and drying the collected nanoparticles. In the method of the present invention, the cetyltrimethyl ammonium salt is preferably cetyltrimethyl ammonium chloride (CTACl) or cetyltrimethyl ammonium bromide (CTABr). The cetyltrimethyl ammonium chloride is more advantageous in terms of the shape, size and dispersibility of nanoparticles produced than the cetyltrimethyl ammonium bromide.

If the molar ratio of the cetyltrimethyl ammonium salt that is used in the present invention is too low, sufficient hydrolysis of the titanium precursor will not be achieved. On the other hand, even if the amount of cetyltrimethyl ammonium salt used is too large, it will not greatly influence the structure of titanium dioxide nanoparticles produced. Thus, the molar ratio of titanium n-butoxide (TNBT): cetyltrimethyl ammonium salt (CTAS) is preferably 4:0.5 to 4:2 in economic terms.

The hydrothermal reaction (hydrothermal treatment) is preferably carried at a temperature of 60~120° C. for 6-48 hours. The temperature of the hydrothermal reaction has the greatest effect on the structure of titanium dioxide nanoparticles synthesized, suggesting that the temperature of the hydrothermal reaction is a more important variable than the molar ratio of the titanium precursor and the CTAS. The reaction time has no special effect on the structure of nanoparticles. In Examples of the present invention, when the temperature of the hydrothermal reaction was 60° C. or lower, titanium dioxide was synthesized as porous particles, not as nanoparticles, although the data thereon are not specifically described herein. Even when the temperature of the hydrothermal reaction is higher than 120° C., titanium dioxide nanoparticles are produced, but the temperature of the hydrothermal reaction is preferably 120° C. or lower in view of the efficiency of the process. If the hydrothermal reaction time is too short, the hydrolysis of the titanium precursor will not be completely achieved. Also, when the hydrolysis of the titanium precursor is completed, even if the reaction time is extended, the structure of titanium dioxide nanoparticles will not be greatly influenced. For this reason, it is meaningless to carry out the reaction for 48 hours or longer.

The amount of water that is used in the hydrothermal reaction is preferably 0.35-1.4 times (w/w) the amount of the titanium precursor. If the amount of water that is used in the hydrothermal is too small, sufficient hydrolysis of the titanium precursor will not be achieved, and if the amount of water is too large, the morphology of titanium dioxide particles will not be easily controlled due to rapid hydrolysis, and the size of titanium dioxide particles will become larger. Distilled water may be added to and react with the titanium precursor and the cetyltrimethyl ammonium salt, but if the ceryltrimethyl ammonium salt used is an aqueous reagent like the case of Examples of the present invention and if the amount of water contained in the reagent is within the above-described range, additional water does not need to be used.

The titanium dioxide nanoparticles prepared in the present invention had a relatively uniform size of about 5 nm, and the results of X-ray diffraction analysis of the prepared titanium dioxide nanoparticles indicated that no peaks of impurities were observed and the prepared nanoparticles had an anatase crystal structure, even when the nanoparticles were not separately treated.

The crystallinity of the anatase-type titanium dioxide nanoparticles prepared in the present invention can be further improved by carrying out a calcination process before or after the drying step. The calcination process is preferably carried out at a temperature of 300~500° C. for 4-12 hours. In the present invention, the higher the calcination temperature and the longer the calcination time, the higher was the crystallinity of the nanoparticles, but when the calcination temperature was too high or the calcination time was too long, the size of the nanoparticles was increased due to aggregation.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION OF EMBODIMENTS

Hereinafter, the present invention will be described in detail with reference to examples. It is to be understood, however, that these examples are for illustrative purposes only and are not to be construed to limit the scope of the present invention.

EXAMPLES

Hydrothermal Synthesis of Anatase-Type Titanium Dioxide Nanoparticles

Example 1

19.2 g (0.056 mol) of titanium n-butoxide (Aldrich) and 18.28 g (0.014 mol) of 25 wt % cetyltrimethyl ammonium chloride aqueous solution were mixed using a mechanical stirrer for 1 hour.

Then, the mixture was transferred into an oven in which it was subjected to a hydrothermal reaction at 100° C. for 24 hours. The precipitate produced by the hydrothermal synthesis reaction was filtered under reduced pressure, washed 2-3 times with distilled water and ethanol, and then dried in a dry oven at 70° C. for 12 hours.

Figure 1:
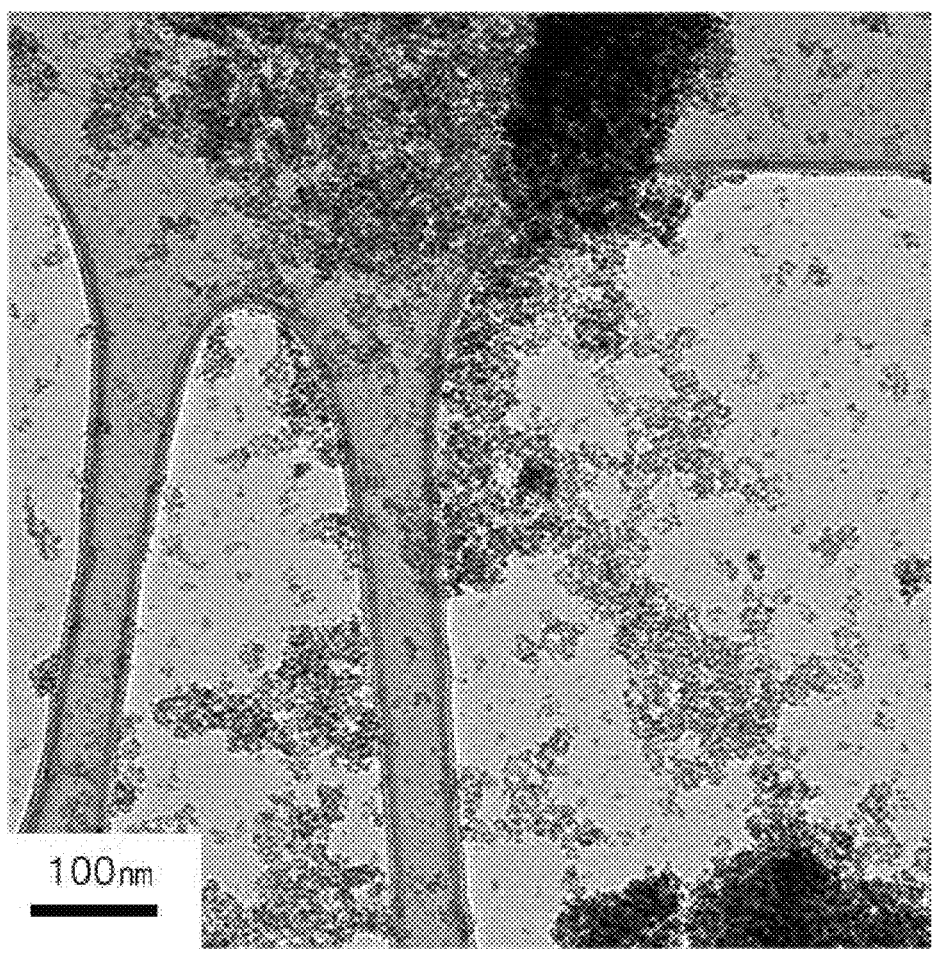
FIG. 1 is a low-magnification transmission electron micrograph of titanium dioxide nanoparticles prepared according to an embodiment of the present invention.
Figure 2:
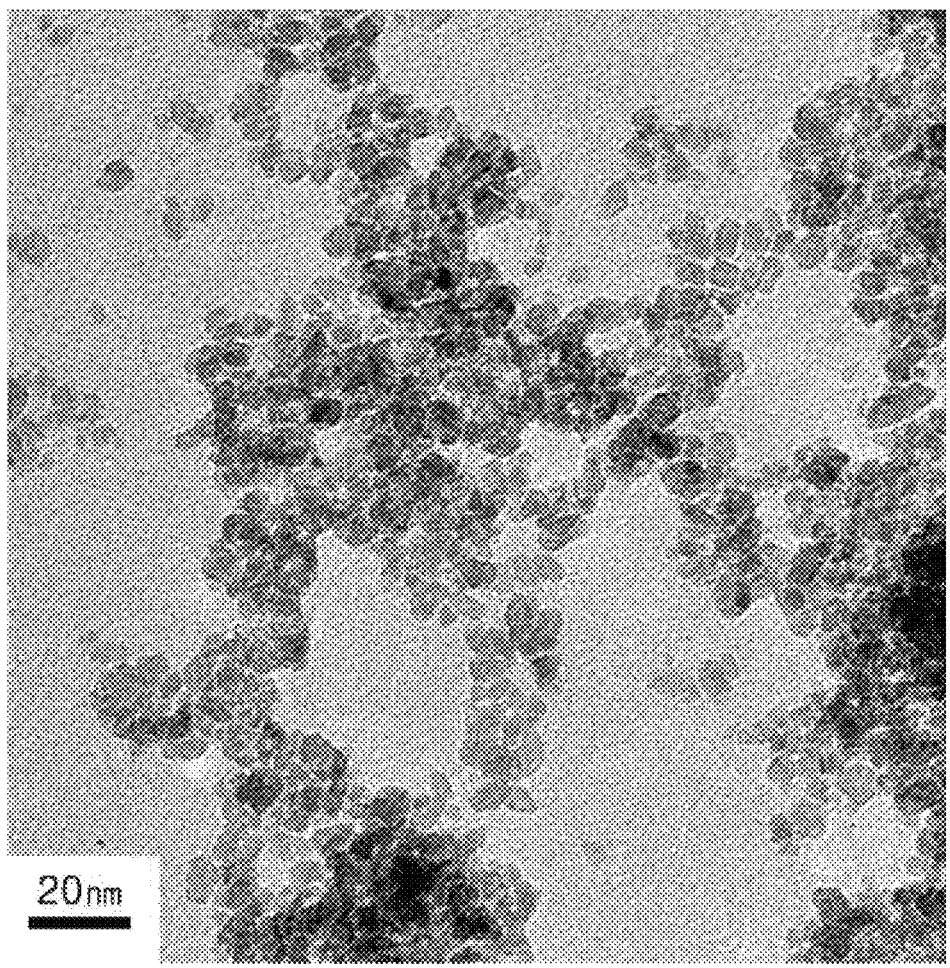
FIG. 2 is an enlarged transmission electron micrograph of the titanium dioxide nanoparticles of FIG. 1.

The titanium dioxide nanoparticles prepared as described above were observed by low-magnification transmission electron microscopy (JEOL 2100F), and the results of the observation are shown in FIGS. 1 and 2. As can be seen in FIG. 1, the spherical titanium dioxide nanoparticles had a relatively uniform particle size distribution. FIG. 2 is an enlarged photograph of the sample shown in FIG. 1, and as can be seen therein, the titanium dioxide nanoparticles prepared in this Example had a particle size of about 5 nm and were nanoparticles having a size smaller than 10 nm.

Figure 3:
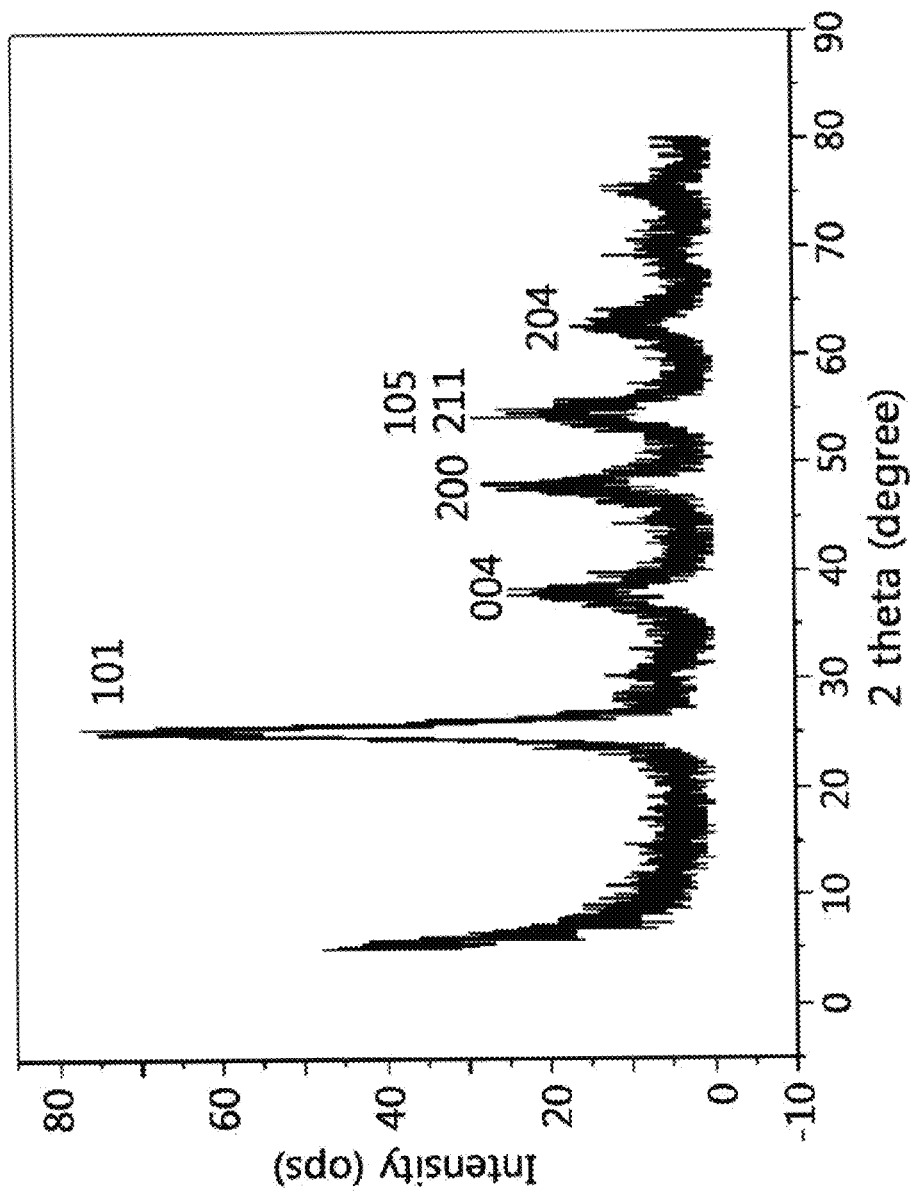
FIG. 3 is an X-ray diffraction (BRUKER D8 ADVANCE) spectrum of the titanium dioxide nanoparticles of FIG. 1.

In order to examine the crystallinity of the prepared titanium dioxide nanoparticles, X-ray diffraction analysis (BRUKER D8 ADVANCE) was performed, and the results of the analysis are shown in FIG. 3. From the broadness of the X-ray diffraction spectrum shown in FIG. 3, it could be seen that the titanium dioxide nanoparticles had a small size as shown in FIG. 2 and that no peaks of other impurities were observed, suggesting that the nanoparticles were pure titanium dioxide nanoparticles. Also, from the diffraction spectrum of the synthesized titanium dioxide nanoparticles, the nanoparticles were indexed as anatase titanium dioxide (tetragonal, a=3.7852, b=3.7852, c=9.5139 Å, $\alpha=\beta=\gamma=90°$.

Example 2

The anatase-type titanium dioxide nanoparticles prepared in Example 1 were transferred into an electric furnace in which they were heated at a rate of 5° C./min and heat-treated at 500° C. for about 6 hours.

Figure 4:
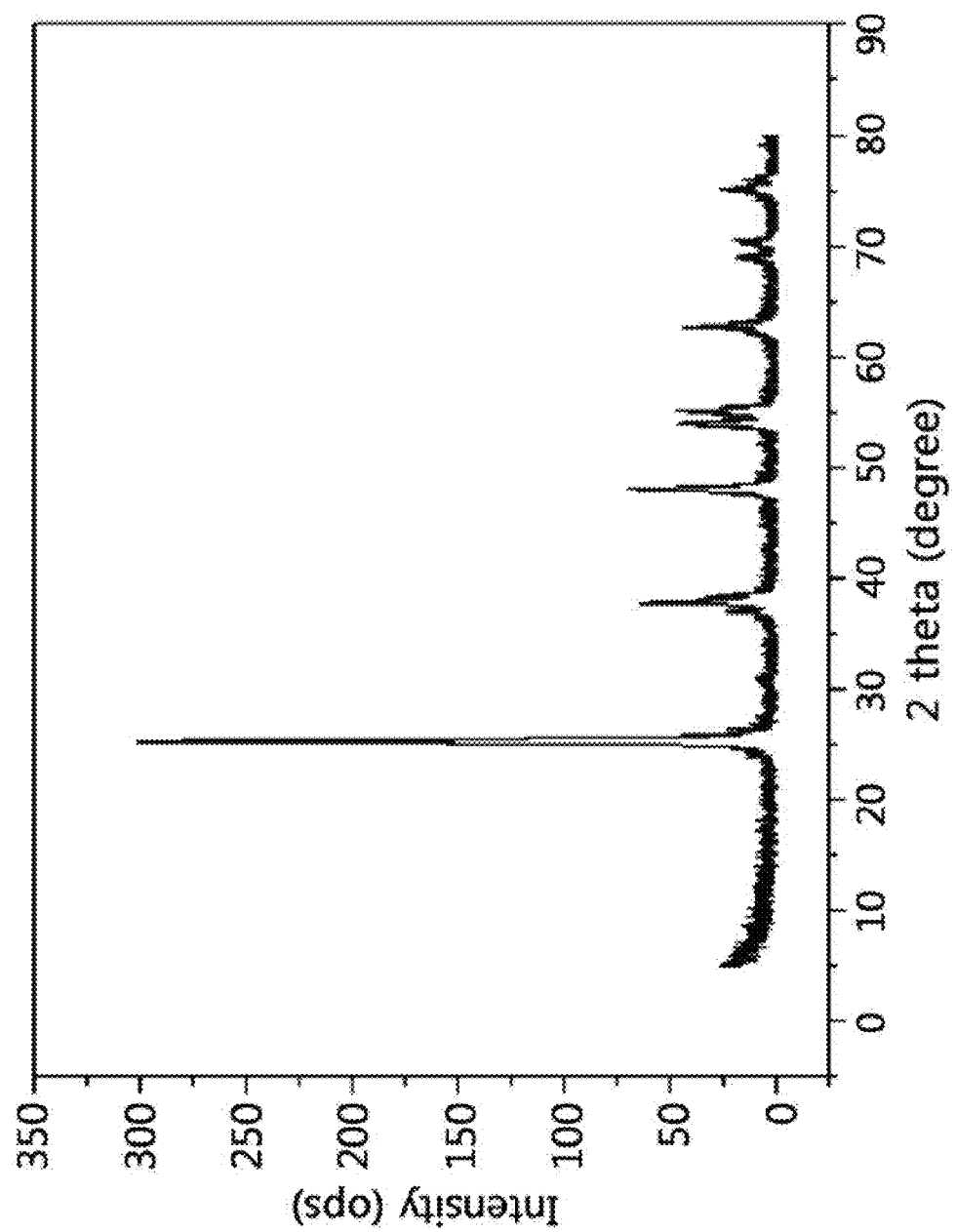
FIG. 4 is an X-ray diffraction spectrum of titanium dioxide nanoparticles prepared according to another embodiment of the present invention.

FIG. 4 shows the results of X-ray diffraction analysis of the titanium dioxide nanoparticles prepared as described above, and as can be seen therein, the titanium dioxide nanoparticles were anatase-type titanium dioxide nanoparticles, like the results of FIG. 3. Also, the X-ray diffraction peaks of FIG. 4 were more definite than those of FIG. 3, suggesting that the crystallinity of the titanium dioxide nanoparticles was improved.

Figure 5:
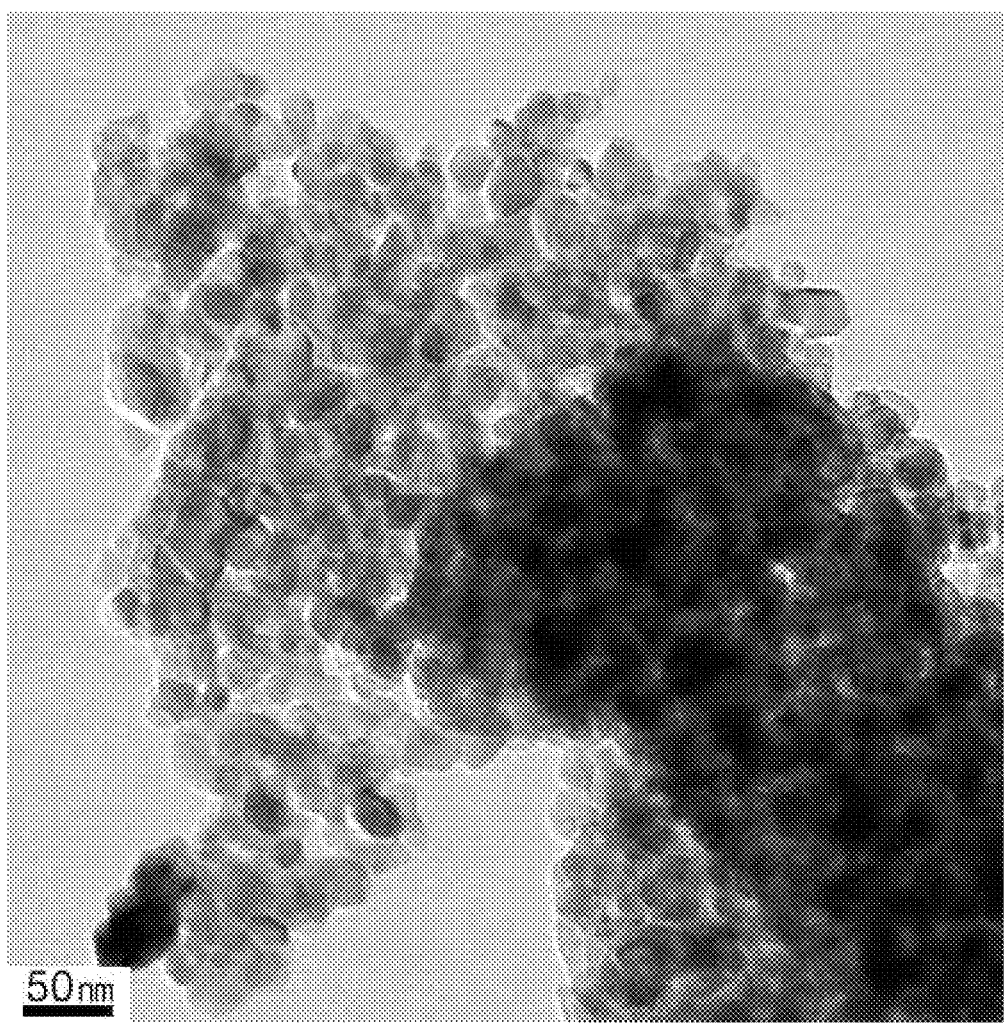
FIGS. 5 and 6 are field emission-transmission electron microscopes of the titanium dioxide nanoparticles of FIG. 4.
Figure 6:
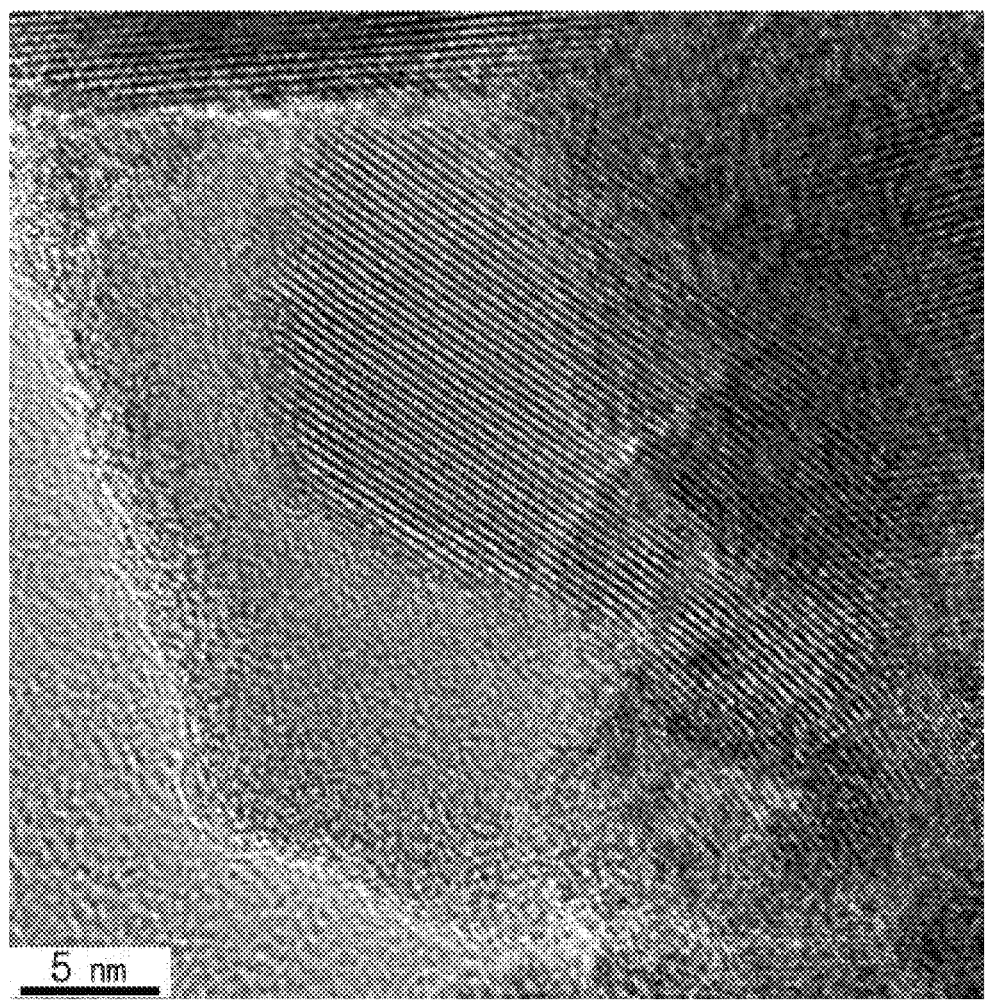

FIGS. 5 and 6 are field emission-transmission electron microscopes taken after heat-treating the sample of FIG. 1 at 500° C. and show the titanium dioxide nanoparticles at higher magnifications than those shown in FIGS. 1 and 2. A high-resolution lattice fringe image can be observed in FIG. 6.

According to the present invention, anatase-type titanium dioxide nanoparticles having excellent photocatalytic activity can be cost-effectively prepared by a simpler method, and thus the application of photocatalysts in various fields can be further made.

As described above, according to the present invention, anatase-type titanium dioxide nanoparticles having excellent crystallinity can be easily prepared in large amounts by a simpler process without needing heat treatment. Thus, it is expected that the present invention will allow anatasep-type titanium dioxide nanoparticles to be used in many applications and will have economic impacts on the photocatalyst market.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for preparing titanium dioxide nanoparticles in an anatase structure, the method comprising the steps of:
    (A) uniformly mixing titanium n-butoxide and cetyltrimethyl ammonium salt in a solvent to obtain a mixture, wherein the solvent consists essentially of water;
    (B) subjecting the mixture obtained in step (A) to a hydrothermal treatment at a temperature of 60~120° C.; and (C) collecting titanium dioxide nanoparticles in the anatase structure produced by the hydrothermal treatment through precipitation and drying the collected nanoparticles.

2. The method of claim 1, wherein the cetyltrimethyl ammonium salt is cetyltrimethyl ammonium chloride or cetyltrimethyl ammonium bromide.

3. The method of claim 1, wherein the molar ratio of titanium n-butoxide: cetyltrimethyl ammonium salt is 4:0.5 to 4:2.

4. The method of claim 1, wherein the method further comprises a step of calcining the titanium dioxide nanoparticles, collected in step (C), before or after drying the nanoparticles.

5. The method of claim 4, wherein the calcining step is carried out at a temperature of 300~500° C. for 4-12 hours.

6. The method of claim 3, wherein the method further comprises a step of calcining the titanium dioxide nanoparticles, collected in step (C), before or after drying the nanoparticles.

7. The method of claim 6, wherein the calcining step is carried out at a temperature of 300~500° C. for 4-12 hours.

8. The method of claim 1, wherein the hydrothermal treatment in the step (B) is carried out at a temperature of 60~120° C. for 6 to 48 hours.

9. The method of claim 1, wherein the cetyltrimethyl ammonium salt is cetyltrimethyl ammonium chloride.

* * * * *